(12) United States Patent
Lowe

(10) Patent No.: US 9,970,705 B2
(45) Date of Patent: May 15, 2018

(54) HIGH TEMPERATURE DRYER SEALS AND RELATED METHODS

(71) Applicant: Felters of South Carolina, LLC, Roebuck, SC (US)

(72) Inventor: Vernon J. Lowe, Greenback, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 0 days. days.

(21) Appl. No.: 14/842,827

(22) Filed: Sep. 1, 2015

(65) Prior Publication Data

US 2016/0187062 A1    Jun. 30, 2016

Related U.S. Application Data

(63) Continuation-in-part of application No. 14/242,855, filed on Apr. 1, 2014, now Pat. No. 9,562,610.

(60) Provisional application No. 62/044,405, filed on Sep. 1, 2014, provisional application No. 61/806,944, filed on Apr. 1, 2013.

(51) Int. Cl.
| | |
|---|---|
| *F16J 15/06* | (2006.01) |
| *F26B 25/00* | (2006.01) |
| *F16J 15/16* | (2006.01) |
| *B05D 5/00* | (2006.01) |
| *B05D 3/00* | (2006.01) |
| *C09K 21/02* | (2006.01) |
| *D06F 58/04* | (2006.01) |
| *D06F 58/06* | (2006.01) |

(52) U.S. Cl.
CPC ............ *F26B 25/008* (2013.01); *B05D 3/007* (2013.01); *B05D 5/00* (2013.01); *C09K 21/02* (2013.01); *D06F 58/04* (2013.01); *F16J 15/065* (2013.01); *F16J 15/16* (2013.01); *D06F 58/06* (2013.01); *Y10T 156/1036* (2015.01)

(58) Field of Classification Search
CPC .......... F16J 15/06; F16J 15/064; F16J 15/065; F26B 25/008; F26B 11/024
See application file for complete search history.

(56) References Cited

U.S. PATENT DOCUMENTS

| | | | | |
|---|---|---|---|---|
| 2,459,720 | A | * | 1/1949 | Poltorak ................. F16L 23/22 156/227 |
| 5,407,214 | A | * | 4/1995 | Lew ....................... F16J 15/065 277/608 |
| 5,765,838 | A | * | 6/1998 | Ueda ....................... F16J 15/22 277/580 |
| 2006/0111003 | A1 | * | 5/2006 | Balthes ................. B29C 43/021 442/327 |

(Continued)

*Primary Examiner* — Gilbert Y Lee
(74) *Attorney, Agent, or Firm* — J. Bennett Mullinax, LLC

(57) ABSTRACT

Fire retardant dryer seals and related methods are provided herein. A fire retardant dryer seal can include a first base substrate having a first end and a second end. At least a portion of the first base substrate can include a low-melt polymer with the first base substrate forming contact surfaces of the dryer seal for contacting portions of a dryer when installed in the dryer. The first end and the second end of the first base substrate can be secured together so that the first base substrate forms at least a portion of an annular shape. The fire retardant dryer seal can also include a heat resistant coating disposed on the dryer seal that does not comprise the contact surfaces of the first base substrate.

21 Claims, 11 Drawing Sheets

(56) References Cited

U.S. PATENT DOCUMENTS

| | | | |
|---|---|---|---|
| 2006/0178064 A1* | 8/2006 | Balthes | B29C 43/003 442/59 |
| 2007/0116991 A1* | 5/2007 | Balthes | B29C 43/003 428/35.6 |
| 2007/0141318 A1* | 6/2007 | Balthes | B32B 5/28 428/293.4 |
| 2008/0090477 A1* | 4/2008 | Balthes | B29C 43/003 442/136 |
| 2014/0248814 A1* | 9/2014 | Handermann | A62C 2/06 442/321 |

* cited by examiner

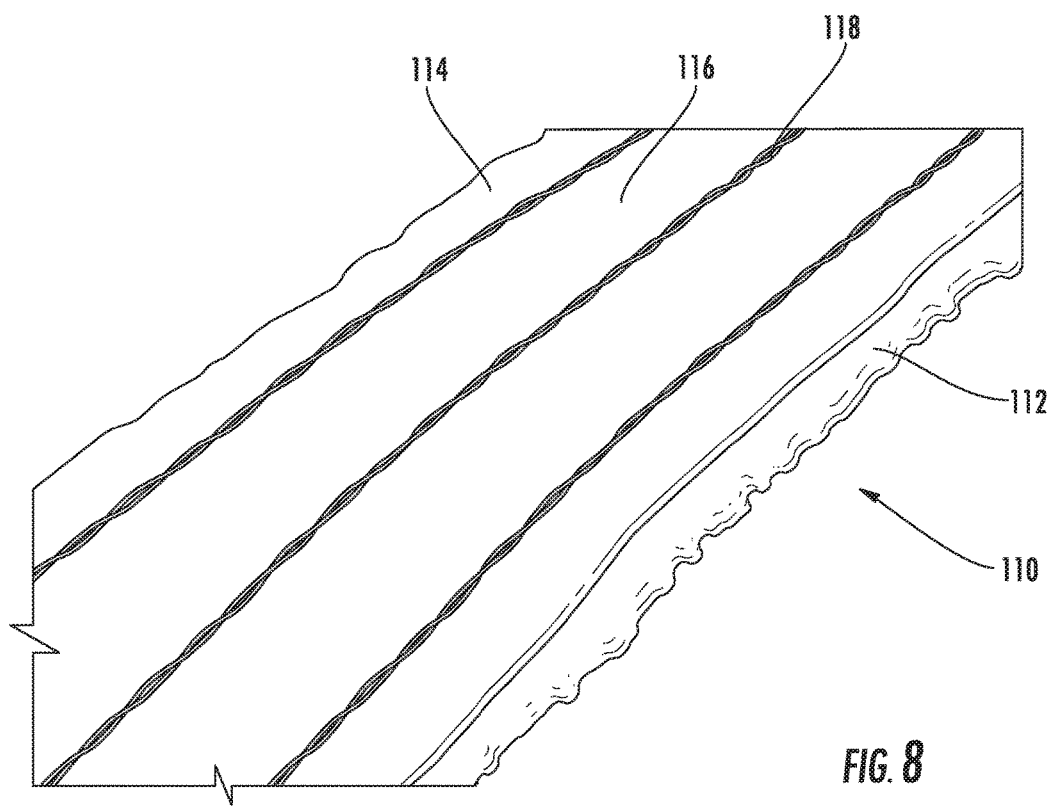

HIGH TEMPERATURE DRYER SEALS AND RELATED METHODS

RELATED APPLICATION

The presently disclosed subject matter claims the benefit of U.S. Provisional Patent Application Ser. No. 62/044,405, filed Sep. 1, 2014, the disclosure of which is incorporated herein by reference in its entirety.

TECHNICAL FIELD

The present subject matter relates to dryer seals and related methods. In particular, the present subject matter relates to fire retardant dryer seals for use in clothes dryer appliances that can allow air within a dryer drum to escape when the seal is heated to higher than normal operation temperatures and to expand to restrict airflow at extremely high temperatures and methods related to such dryer seals.

BACKGROUND

Domestic clothes dryers are a common household appliance that, in conjunction with domestic washers, have reduced the burden of laundry on many households by reducing the amount of time devoted by household caregivers to washing and drying clothes. Such clothes dryers typically include a housing (also known as a bulkhead) and a rotating drum, or cylinder, supported within the housing. Commercially available air vented domestic clothes dryers use the rotating drum to tumble loads of washed clothes in a heated environment by generally using a blower/fan to pull ambient air across heater coils to raise the temperature of air passing into the drum. The heated air is pulled through the tumbling clothes and out through a lint screen for discharge. Commercially available condensing domestic clothes dryers also use the rotating cylinder to tumble loads of laundry in a heat environment, but treat the air in a slightly different manner. These condensing domestic clothes dryers use a blower/fan to pull ambient air across heater coils into the drum, through the tumbling clothes and out through a lint screen, across a condenser coil to remove moisture, and then return to the drum.

Both types of dryers use dryer seals to support and seal the drum usually at both ends. These dryer seals perform a multitude of functions within these domestic clothes dryers. Current seals are made with felt nonwoven materials produced with varying percentages of wool and polyester and also on occasions the addition of vinyl or some low friction material. In particular, these seals are usually in the form of rings of felt which may be disposed between the housing and the drum so as to bear against the drum as it rotates. The materials of the ring can interact to form an elastic fit or may be glued into position depending on the arrangement of components.

The seals serve as a friction surface between the rotating drum and the bulkhead sections while also maintaining a seal to hold drying heat within the drum. In particular, the use of seals is desirable to reduce the friction, or prevent the creation of excess friction, between the drum and the bulkhead and to prevent air leakage between the drum and the clothes dryer cabinet which could detrimentally affect the air flow system of the dryer.

The structure of the seals can vary depending on the type, commercial brand and design of the dryer. Many current seals have multi-layered ring structures incorporating a folded over exterior layer such as wool-blend, polyester, rayon, aramid fibers or polyester blend nonwoven material. These multi-layered ring structured seals can be folded and stitched to assume different shapes to perform their intended functions within an appropriate dryer design. In some embodiments, a spacer material such as polyester or polyester blend material can also be included that can be held within the folded over exterior. The folded materials can form legs that project outwardly from the folded edge. These legs can have a sealing contacting relationship with the rotating drum. In such seal embodiments, the spacer material can typically be held in place by two seams with a first positioning seam running between an upper edge of the spacer material and one side of the folded over exterior and a second holding seam extending at an inboard position through all three layers so as to establish a coordinated stable structure.

Despite their widespread use in U.S. homes, clothes dryers are involved in a significant number of residential fires. According to some estimates, dryer fires produce annual U.S. property losses approaching $100 million, and lead to multiple consumer deaths and hundreds of injuries. Proper installation and effective maintenance of clothes dryers can significantly reduce the risk of appliance-related fires. But recent research has shown that product construction and design considerations are also important elements in building safer dryers.

The causes of electric dryer fires have been extensively researched over the past decade by the U.S. Consumer Product Safety Commission (CPSC), industry associations including the Association of Home Appliance Manufacturers (AHAM), individual appliance manufacturers, and standards organizations including Underwriters Laboratories (UL). Some research has pointed to the accumulation of lint and the subsequent reduction of air flow as a primary cause of dryer fires. Yet, other testing has supported claims that the cause of dryer fires can be attributed to a number of factors. In particular, studies have found that factors such as a dryer load, a dryer's electrical system, and a dryer's mechanical system also played a major role in reported dryer fires.

While increased consumer education regarding risks with dryer use can help reduce the number of dryer fires, attention should be focused on the design of dryers themselves and the ability of a dryer unit to actually contain a fire should one occur. United States (U.S.) fire regulations have been defined by UL Appliance Containment #UL 2158, which requires that a fire in the appliance be contained within the appliance and not allowed to escape into the environment surrounding the appliance. For fires that initiate inside the drum of a clothes dryer, one potential point of egress is the mating area between the cylinder and the front door and/or rear bulkhead. Clothes dryer fires have a wide temperature range depending on the fuel value of the load plus any fuel value items in the unit construction such as plastic baffles, friction reducing rings, fittings or bulkhead components, etc. The temperatures have been tested to exceed 1300° F. and cycle between low and high values. These temperatures exceed the capability of sustaining structural integrity of traditionally used wool and polyester nonwoven materials, even FR treated polyesters.

Another serious and dangerous situation that arises when a fire starts or begins to smolder within the drum is the opportunity of a smoke explosion. A smoke explosion is a condition whereby the rapid increase in pressure inside the drum/combustion chamber during a dryer fire is sufficient to overcome the door lock mechanism. The lock specification has been tested and indicated a twelve (12) foot pounds locking force. Therefore, these smoke explosions create a great release of force that can create opportunity for bodily injury to people in the vicinity of the dryer and can cause the fire to spread quickly from being contained in the dryer to area surrounding the dryer and to other parts of the house. These smoke explosions occur when a fire is contained in the drum producing smoke and providing a spark. Tests have shown that, as fire burns, the right mixture of carbon monoxide (CO) from the white smoke, which contains residual unburnt hydrocarbons, and oxygen ($O_2$) can occur within drum. The fire ignites this deadly mixture once it is achieved to explosive and horrific effect. Such a condition is known as pyrolysis.

As such, a need exists for improved dryer seals that can help reduce the opportunity of smoke explosions within dryers and that can help contain fires that initiate inside of a drum of a clothes dryer.

SUMMARY

The present subject matter provides seals for use in clothes dryers and related methods. In particular, dryer seals are provided that can facilitate containment of drum initiated fires and reduce opportunity for smoke explosions within the dryers in which they are used once an ignition or a fire occurs while still providing friction reduction and air sealing capabilities under normal operating conditions. Methods related to the manufacture and use of the dryer seals disclosed herein are also provided.

Thus, it is an object of the presently disclosed subject matter to provide dryer seals that have fire retardant and/or fire resistant properties and methods related to such dryer seals. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 8 illustrates a perspective view of a portion of a further example embodiment of a high temperature dryer seal according to the present subject matter;

Figure 1:
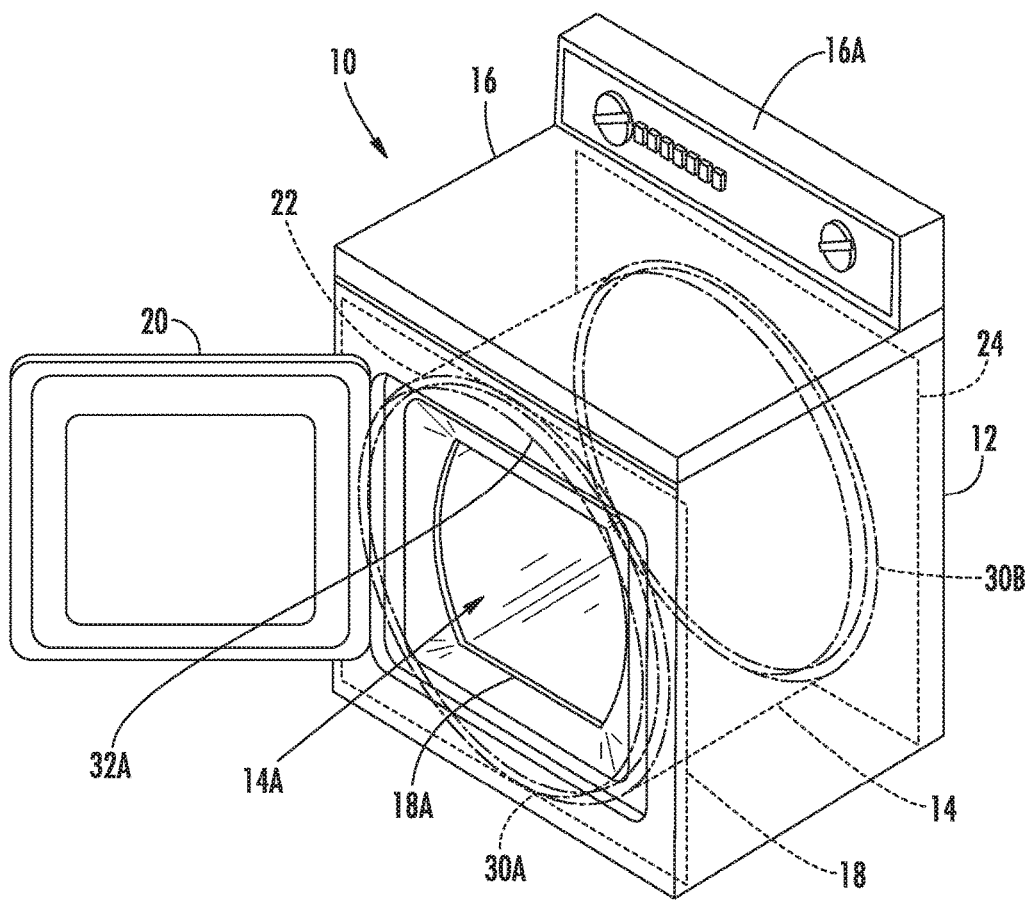
FIG. 1 illustrates a perspective view of an embodiment of a clothes dryer with a rotating drum that includes an embodiment of a seal according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 µm) are generally referred to as "microparticles", since the micrometer scale generally involves those materials having an average size of greater than 1 µm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers: copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Dryer seals have been shown and described in detail in U.S. Provisional Patent Application Ser. No. 61/806,944 and U.S. patent application Ser. No. 14/242,855, which are incorporated herein in their entireties. The dryer seals described provide ample background and understanding of the operation of the dryer seal and description of the improvements to the dryer seals that are enhanced present description.

As disclosed herein, high temperature dryer seals are provided. A high temperature dryer seal can comprise a first base substrate having a first end and a second end. In some embodiments, the first base substrate can comprise a blend of low-melt polymer fibers and at least one of high-melt fibers or high-temperature burn fibers. In some embodiments, the first base substrate can comprise low-melt polymer fibers. For example, in some such embodiments, the first base substrate can comprise 100% low-melt polymer fibers. The first base substrate can form contact surfaces of the dryer seal for contacting portions of a dryer when the seal is installed in the dryer. The first end and the second end of the first base substrate can be secured together so that the first base substrate forms at least a portion of an annular shape. In some embodiments, a heat resistant coating can be disposed on at least a portion of a surface of the first base substrate that does not comprise the contact surfaces. The heat resistant coating can have an activation temperature that is higher that a melting point temperature of the low-melt polymer fibers. In some embodiments, the heat resistant coating can comprise particles of an inorganic mineral material dispersed within a binder. In some embodiments, the heat resistant coating can comprise intumescent material dispersed within a binder. In some embodiments of a high temperature dryer seal, a second substrate can be provided on which the heat resistant coating is disposed and the second substrate can be secured to the first base substrate on at least a portion of a surface of the first base substrate that does not comprise the contact surfaces.

The first base substrate can help to reduce or eliminate the opportunity for smoke explosions from occurring in the dryers that employ these seals, because the low-melt polymer fibers melts when exposed to temperatures above a melting point to create passages for air flow through the dryer seal to allow at least a portion of any air and smoke mixture within a drum of a dryer to which the seal is installed to escape from the drum. Thus, the melted dryer seal can limit and restrict the combustion process by allowing air to flow from the drum exhausting the unspent hydrocarbons to reduce or eliminate any possible pyrolysis event. For example, the low-melt polymer fibers, once melted when exposed to temperatures above its melting point, can create passages for air flow between a rim of a drum and a bulkhead of a dryer of about 0.010 inches and about 0.012 inches around the rim of the drum. As heat within the dryer drum increases, the heat resistant coating can be activated causing it to expand and restrict the flow of too much air into the drum to limit the ability of material, such as clothing, within the dryer that are smoldering to combust or material, such as clothing, within the dryer that may be burning to burn at a rate that allows the fire to escape the drum. In this manner, such dry seals can operate as an air throttle for the dryer drum that, depending on the circumstances, prevents air flow into and from drum, increases air flow from the drum, or restricts air flow into the drum.

The first base substrate can comprise any number of types of substrates. For example, the first base substrate can comprise a nonwoven fabric, woven fabric or a knitted fabric. Such fabrics can comprise a low-melt polymer. For example, in some embodiments, such fabrics can comprise a blend of a low-melt thermoplastic polymer and a high-melt thermoplastic polymer. In some embodiments, such fabrics can comprise 100% low-melt thermoplastic polymer.

In some embodiments, the first substrate comprises a needle-punched nonwoven fabric comprising between about 20% and about 80% low-melt polymer fibers and between about 80% and about 20% high-melt polymer fibers. For example, in some embodiments, the needle-punched nonwoven fabric can comprise about 20% low-melt polymer fibers and about 80% high-melt polymer fibers. In some embodiments, the needle-punched nonwoven fabric can comprise about 50% low-melt polymer fibers and about 50% high-melt polymer fibers. In some embodiments, the needle-punched nonwoven fabric can comprise about 80% low-melt polymer fibers and about 20% high-melt polymer fibers. In some embodiments, the needle-punched nonwoven fabric can comprise about 100% low-melt polymer fibers.

In some of these embodiments, the first substrate can comprise a needle-punched nonwoven fabric comprising a blend of low-melt high density polyethylene (HDPE) fibers and polyester fibers. For example, the first substrate can comprise a needle-punched nonwoven fabric comprising a blend of high density polyethylene (HDPE) fibers having a melting point of about 270° F. and polyester fibers having a melting point above about 400° F.

In some of these embodiments, the first substrate comprises a needle-punched nonwoven fabric comprising a blend of low-melt high density polyethylene (HDPE) fibers and high-melt polypropylene fibers.

In some embodiments, the first base substrate can comprise a needlepunched nonwoven fabric that can comprise 100% HDPE fiber content. For example, the first substrate can comprise a needle-punched nonwoven fabric comprising a blend of high density polyethylene (HDPE) fibers having a melting point of about 270° F.

Depending on the types of low-melt polymer fibers used, the melting points can vary. In some embodiments, the low-melt polymer fibers can melt between about 265° F. and about 300° F. In some embodiments, the low-melt polymer fibers can melt between about 280° F. and about 295° F. In some embodiments, the low-melt polymer fibers can melt between about 285° F. and about 295° F.

The second substrate can also comprise any number of types of substrates. For example, the second substrate can comprise a nonwoven fabric, woven fabric or a knitted fabric. In some embodiments, the second substrate comprises a structure to provide structural integrity and improve the seal nip without causing axial deflection of the drum. For example, the second substrate comprises a glass reinforced plastic nonwoven. In some embodiments, the second substrate can comprise a fine mesh spun bond fiberglass to act as a substrate for the mineral intumescent coating and a heavier fiberglass scrim to provide structural integrity and improve the seal nip without causing axial deflection of the drum.

In some embodiments, the heat resistant coating can be disposed on both a first surface and second surface of the second base substrate. In some embodiments, the second substrate can be folded to form multiple layers of the heat resistant coating.

The heat resistant coating can comprise varies substances. For example, in some embodiments, the heat resistant coating can comprise inorganic material in a binder. The inorganic material can comprise vermiculite, mica, clay materials, and/or calcium carbonate. The particles of inorganic material can be nanoparticles or microparticles or a mixture of nanoparticles and microparticles. For example, the particles of the inorganic material can have an average thickness of less than about 50 nm, and wherein the particles have a larger dimension of about 0.5 µm to about 50 µm. The binder can comprise a film-forming binder. In some embodiments, the heat resistant coating can comprise at least one intumescent substance in a binder. In some embodiments, the heat resistant coating can comprise particles of inorganic material and at least one intumescent substance in a binder.

The present disclosure also provides methods of forming a fire retardant dryer seal. For example the method can comprise providing a first base substrate having a first end and a second end and a second substrate. The first base substrate can comprise a blend of low-melt polymer fibers and at least one of high-melt fibers or high-temperature burn fibers. A coating composition can be wet-laid onto at least a portion of a first surface of a second substrate. The coating composition can comprise particles of an inorganic mineral, a film-forming binder, and a solvent. The coating composition can be dried to remove the solvent and form a heat resistant coating on the second substrate. The first and second ends of the first base substrate can be secured to each other to form an annular configuration of the dryer seal. During this process, contact surfaces can be formed on the first base substrate of the dryer seal for contacting portions of a dryer when installed in the dryer. The second substrate can be secured to the first base substrate on at least a portion of a surface of the first base substrate that does not comprise the contact surfaces. In some embodiments, the inorganic material is dispersed within the solvent prior to wet-laying the coating composition onto the base substrate. Further, in some embodiments, the inorganic material used to form the particles is exfoliated prior to dispersing the inorganic material within the solvent.

Figure 2:
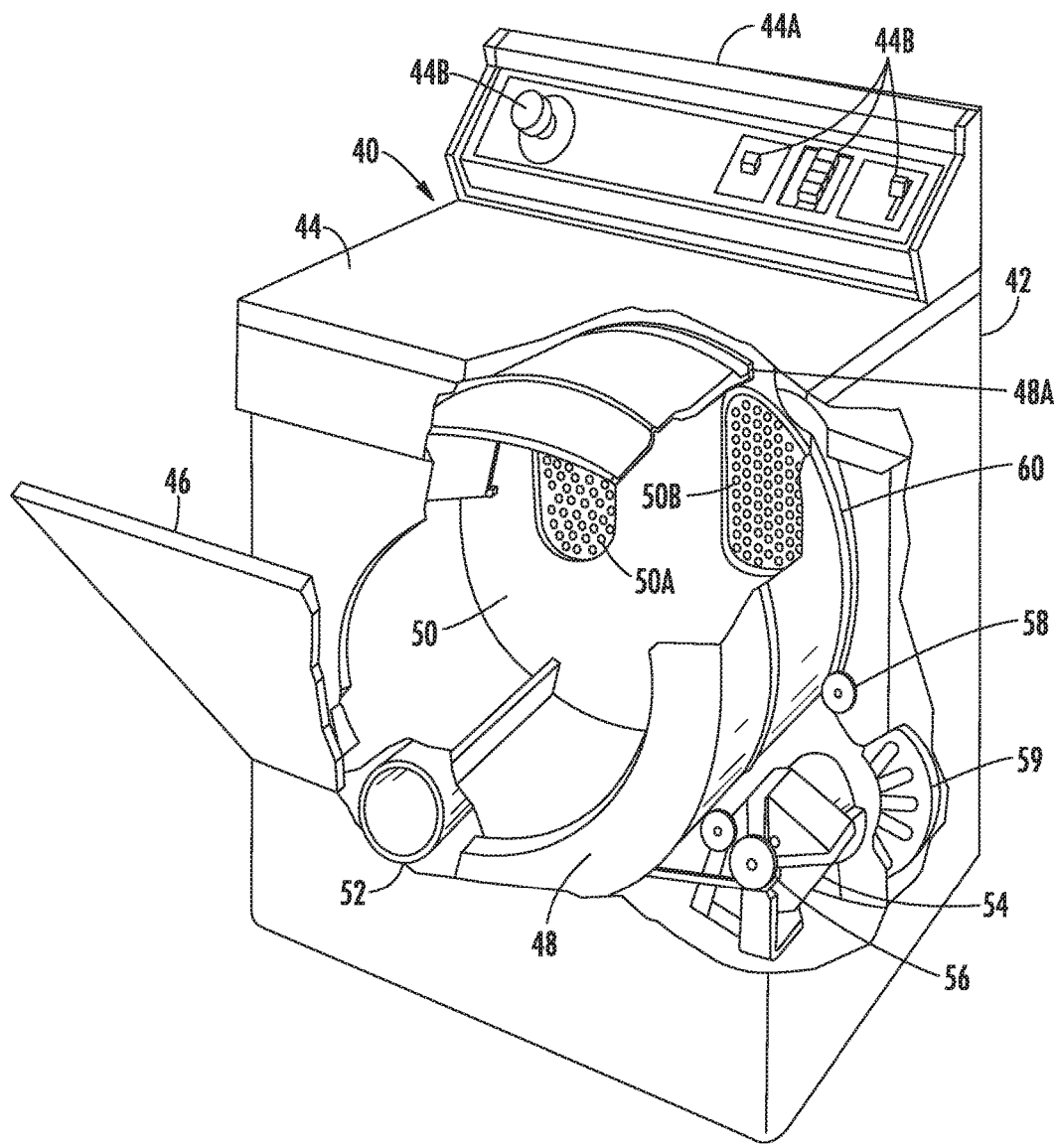
FIG. 2 illustrates a perspective view of another embodiment of a clothes dryer with a rotating drum that uses an embodiment of a seal according to the present subject matter.

Referring now to FIGS. 1 and 2, example embodiments of a domestic clothes dryer are provided that illustrate the general placement and location of dryer seals according to the present disclosure in relation to other components of the respective dryers. In FIG. 1, an embodiment of a dryer 10 comprising a cabinet body 12 housing a heated rotating drum 14 is provided. As illustrated, cabinet body 12 can comprise a top panel 16 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 18 of the cabinet body 12 typically can include a front bulkhead flange 22 (shown schematically as the outer front circular dotted line) surrounding the door opening 18A and projecting into the interior of the cabinet body. In such an embodiment, the front bulkhead flange 22 can be disposed generally around a reduced diameter drum opening. Similarly, cabinet body 12 can comprise a rear bulkhead 24 (shown in dotted lines) that can have a rear bulkhead flange (not shown in FIG. 1) projecting into the interior of the cabinet body and can also be disposed generally around a reduced diameter drum opening.

As shown in FIG. 1, a front seal 30A according to the disclosure herein (shown in dotted circular lines and generally interior to the bulkhead flange 22) can be disposed between the front bulkhead flange 22 of the front bulkhead 18 and a front edge outer wall portion of the drum 14. Similarly, a rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally, the seals 30A, 30B can comprise a structure that includes contact surfaces that can provide a reduced frictional engagement between the bulkheads 18, 24 and the drum 14. Further, one or both of the seals 30A, 30B can comprise a structure that provides both a method to reduce or eliminate smoke explosions within the dryer and fire retardant properties to aid in containment if a fire was to ignite in the drum 14. For example, the seals 30A, 30B can comprise body structures that can include contact surfaces that create a seal when the dryer is operating within normal temperature ranges but allows air flow egress from the dryer at high temperatures above the upper operational temperatures. Further, the seals 30A, 30B can comprise a coating over at least a portion of the respective seal 30A, 30B that provides or enhances the respective seal's fire retardant and/or fire resistant properties. Both of these properties are explained in more detail below.

Referring to FIG. 2, a partial cross-sectional view of a different embodiment of a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater coils or gas burner, and travels axially to the front panel/bulkhead and exits the drum through the screen and fan. It should be understood that the dryer seal technologies disclosed herein can be used in a variety of different dryer configurations.

Dryer 40 can comprise a cabinet body 42 with a top panel 44 having a control console 44A along a rear portion thereof incorporating a plurality of controls 44B for selecting an automatic series of drying steps. The cabinet body 42 can have a front door 46 providing access to the interior of a horizontally rotatable drying drum 48. The cabinet body 42 can also have a non-rotating rear bulkhead 50 with air inlets 50A and air outlets 50B therein for charging the interior of the drum 48 with heated air from a heater 52 and for exhausting moisture laden air. In this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 can also comprise a stationary front bulkhead (not shown) with a front seal (not shown) disposed between the front bulkhead and a front rim of the drum 48.

In operation, the rear seal 60 and the front seal (not shown) used in dryer 40 can prevent or at least reduce the draw of ambient air from around the drum 48. Instead, air is drawn more efficiently through heater 52 and into the drum 48 through air inlets 50A before being eventually discharged through outlets 50. As above, the rear seal 60 and the front seal can comprise a structure that includes contact surfaces that can provide a reduced frictional engagement between the rear bulkhead 50 and the drum 48 and between the front bulkhead and the drum 48. Further, the rear seal 60 and the front seal can comprise a structure that provides both a method to reduce or eliminate smoke explosions within the dryer and fire retardant properties to aid in containment if a fire was to ignite in the drum 48. For example, the rear seal 60 and the front seal can comprise body structures that create a seal when the dryer is operating within normal temperature ranges but allow air flow egress from the dryer at high temperatures above the upper operational temperatures. Further, the rear seal 60 and the front seal can comprise a coating over at least a portion of the respective seal that provides or enhances fire retardant properties of the respective seal as explained in more detail below.

The structure and shape of the seals can be dependent upon the design of the interior of the respective dryer in which the seals are to be used and particularly dependent upon the designed engagement between the respective bulkheads and the drum used within the dryer. In particular, the drum size, drum opening and rim configuration, the bulkhead shape and configuration can impact the determination of the construction, structure, and shape of the respective seals as well as the materials used therein. Depending on the design of the respective dryer, the seal for use between the front rim of the drum and the front bulkhead and the seal between the rear rim of the drum and the rear bulkhead can comprise the same or different structure. For example, the seals can be T-shaped cross-sectional seals, U-shaped cross-sectional seals. V-shaped cross-sectional seals, block shaped cross-sectional seals, seals having folds or loops and/or combinations thereof.

The seals can comprise body structures that create a generally airtight seal nip between the lip of the drum and the respective bulkhead when the dryer is operating within normal temperature ranges, for example, about 180° F. and about 250° F. but allows air flow egress from the dryer at high temperatures above the upper operational temperatures, such as for example, about 260° F. and about 410° F. In particular, in some embodiments, the seals in the structures that form the contact surfaces that create the generally airtight seal nip between the drum and the bulkheads can be made from a mix of low-melt polymers and high-melt polymers. In some embodiments, the seals in the structures can comprise low-melt polymer.

For example, the dryer seal can comprise a first base substrate that can comprise a textile material, such as a woven, nonwoven, and/or a knit made of a mixture of low-melt polymer fibers and high-melt polymer fibers. In some embodiments, a first base substrate that can comprise a textile material, such as a woven, nonwoven, and/or a knit made of 100% low-melt polymer fibers as stated above. For instance, first base substrate can comprise a needle-punched nonwoven of a blend of low-melt polymer fibers and high-melt polymer fibers. In some embodiments, for example, the blend can be between about 20% and about 80% low-melt polymer fibers and between about 80% and about 20% high-melt polymer fibers. By having the low-melt polymers in the first substrate, when the heat within the dryer drum reach high temperatures outside of the normal operating temperatures due to some smoldering, ignition activity, or fire within the drum, the low-melt polymers melt away allowing air to flow therethrough while still providing a structure that can have an integrity to reside between the dryer drum and the bulkhead and not create excessive drum float. In particular, the air and smoke mixture within the drum that has become pressurized is allowed to escape from the drum. Thereby, the mixture is less likely to reach the critical point where ignition of a smoke explosion is possible and/or likely.

Further, the fire-retardant properties are also imparted to the dryer seals to then reduce or restrict airflow into the drum if the temperatures and/or flames within the drum get too high. For example, an intumescent material can be disposed on some portion of the seal, excluding the contact surfaces. The fire-retardant properties as disclosed herein, however, can still be imparted to most any configuration of dryer seals with the varying of the application and positioning of such properties when taking into consideration the friction reducing and sealing design requirements of the respective seal. Example embodiments of methods of manufacture and seal configurations or structures are provided below as illustrative of the concepts of the dryer seals subject matter disclosed herein.

Figure 3A:
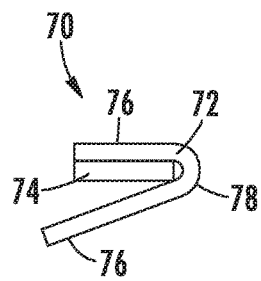
FIG. 3A illustrates a schematic cross-sectional view of an embodiment of a dryer seal without or prior to application of an embodiment of a high temperature, fire retardant coating according to the present subject matter.

FIGS. 3A-5C illustrate different example embodiments of dryer seals that can comprise fire retardant properties and their use within a dryer. Referring to FIGS. 3A-3C, an embodiment of a dryer seal, generally designated 70, is provided that can be folded to form a U-shaped seal. The dryer seal 70 can comprise a first base substrate 72. The first base substrate 72 can comprise a textile material, such as a woven, nonwoven, and/or a knit as well as, in some embodiments, an extruded layer such as a film. For example, the first base substrate 72 can be a nonwoven substrate that includes a blend of low-melt polymer fibers and high-melt polymer fibers. For example, in some embodiments, the first base substrate 72 can comprise a needlepunched nonwoven fabric that can comprise a blend that can be between about 20% and about 80% low-melt polymer fibers and between about 80% and about 20% high-melt polymer fibers. In some embodiments, the first base substrate 72 can comprise a needlepunched nonwoven fabric that can comprise 100% HDPE fiber content. A second base substrate 74 can be secured to a portion of the first base substrate 72. The second base substrate 74 can comprise one or more textile materials, such as a woven, nonwoven, and/or a knit as well as an extruded layer. The first base substrate 72 and the second base substrate 74 can be secured together in different manners including, but not limited to, sewing, stitchbonding, heat bonding, adhesive bonding, RF welding, ultrasonic welding, or the like.

Figure 3B:
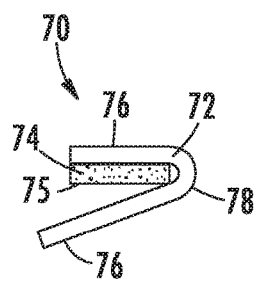
FIG. 3B illustrates a schematic cross-sectional view of the embodiment of a dryer seal according to FIG. 3A with an embodiment of a high temperature, fire retardant coating thereon according to the present subject matter.

When configured for installation within a dryer, the dryer seal 70 can be folded along fold 78 to form legs 76 that position the second base substrate within an interior position. As shown in FIG. 3B, a heat resistant coating 75 can be applied over one or more surfaces of the second base substrate 74 that can include inorganic particles and/or additives within a binder material that can provide fire retardant properties. The inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are generally protected from the heat and flame, remaining structurally sound during a fire event.

Figure 3C:
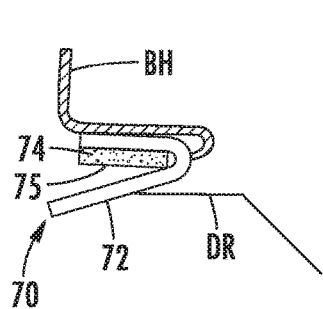
FIG. 3C illustrates a schematic cross-sectional view of the embodiment of the high temperature dryer seal according to FIGS. 3A and 3B disposed within an embodiment of a clothes dryer according to the present subject matter.

As shown in FIG. 3C, the dryer seal 70 can be secured between a bulkhead 8H and a rim DR of a drum so that the legs 76 are positioned between the coated second base substrate 74 and the bulkhead BH as well as the rim DR of the drum. The dryer seal 70 can be attached to the bulkhead BH with the first base substrate 72 frictionally contacting the rim DR of the drum. The first base substrate 72 and the second base substrate 74 can be elongate substrate strips that can be joined together at their ends to form a circular configuration. In some embodiments, the dryer seal 70 can be used as a front seal as shown in FIG. 3C.

Figure 4A:
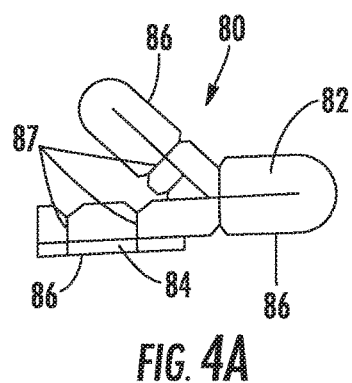
FIG. 4A illustrates a schematic cross-sectional view of another embodiment of a dryer seal without or prior to application of an embodiment of a high temperature, fire retardant coating according to the present subject matter.
Figure 4B:
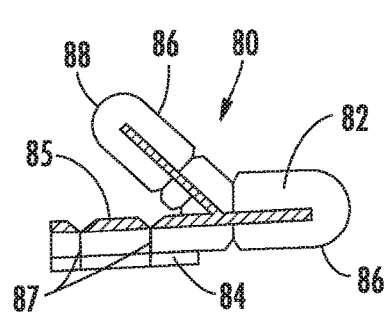
FIG. 4B illustrates a schematic cross-sectional view of the embodiment of a dryer seal according to FIG. 4A with an embodiment of a high temperature, fire retardant coating thereon according to the present subject matter.
Figure 4C:
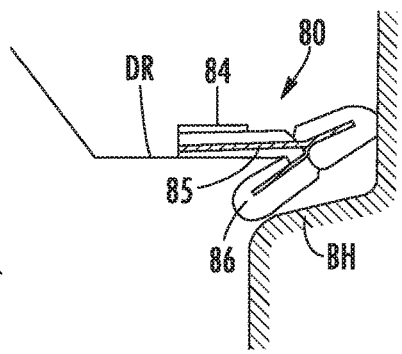
FIG. 4C illustrates a schematic cross-sectional view of the embodiment of a high temperature dryer seal according to FIGS. 4A and 4B disposed within an embodiment of a clothes dryer according to the present subject matter.

Referring to FIGS. 4A-4C, another example embodiment of a dryer seal, generally designated 80, is provided that can form a Y-shaped seal. The dryer seal 80 can comprise a first base substrate 82. The first base substrate 82 can comprise a textile material, such as a woven, nonwoven, and/or a knit as well as, in some embodiments, a film. The first base substrate 82 can comprise one or more thermoplastic polymers.

For example, in some embodiments, the first base substrate 82 can comprise one or more low-melt polymers. In some embodiments, the first base substrate 82 can comprise 100% low-melt polymer fibers. In some embodiments, the first base substrate 82 can be a nonwoven substrate that includes a blend of low-melt polymer fibers and high-melt polymer fibers. For example, the first base substrate 82 can comprise a needlepunched nonwoven fabric that can comprise a blend that can be between about 20% and about 80% low-melt polymer fibers and between about 80% and about 20% high-melt polymer fibers. The first base substrate 82 can be folded along folds 88 and stitchbonded with stitching 87 to form three legs 86 in a Y formation. In some embodiments, second base substrate 84 can be stitchbonded to a single layered leg 86 of the first base substrate 82. The other legs 86 can comprise a double layer of the first base substrate 82. The second base substrate 84 can comprise a textile material, such as a woven, nonwoven, and/or a knit as well.

As shown in FIG. 4B, a heat resistant coating 85 can be applied over a first surface of the first base substrate 82 that can include inorganic particles and/or additives within a binder material that can provide fire retardant properties. As above, the inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are protected from the heat and flame, remaining structurally sound during a fire event. Due to the folding and stitching of the first substrate 82, the heat resistant coating 85 can reside between the double layers of the first substrate 82 of the double layered legs 86. The heat resistant coating 85 can also be on the opposite side of the first substrate 82 where the second base substrate 84 is attached to the first substrate 82. In some embodiments, the second base substrate 84 can additionally or alternatively have a heat resistant coating 85 thereon. In some embodiments, the second substrate 84 may not be included.

As shown in FIG. 4C, the dryer seal 80 can be secured between a bulkhead BH and a rim DR of a drum so that the double layered legs 86 are positioned between the bulkhead BH and the rim DR of the drum. Additionally, the rim DR can be placed between the single leg 86 with the second base substrate 84 thereon and one of the double layered legs 86. The dryer seal 80 can be attached to the rim DR with at least one of the double layered legs 86 frictionally contacting the bulkhead BH. In some embodiments, the dryer seal 80 can be used as a rear seal as shown in FIG. 4C.

Figure 5A:
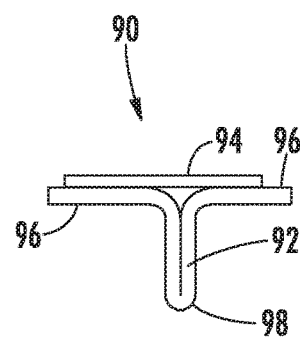
FIG. 5A illustrates a schematic cross-sectional view of further embodiment of a dryer seal without or prior to application of an embodiment of a high temperature, fire retardant coating according to the present subject matter.
Figure 5B:
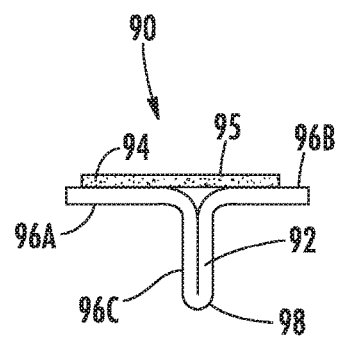
FIG. 5B illustrates a schematic cross-sectional view of the embodiment of a dryer seal according to FIG. 5A with an embodiment of a high temperature, fire retardant coating thereon according to the present subject matter.
Figure 5C:
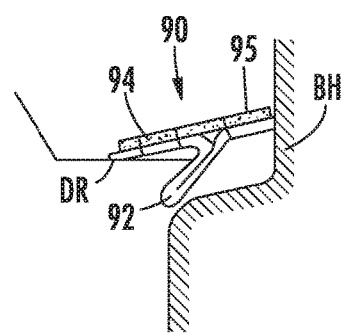
FIG. 5C illustrates a schematic cross-sectional view of the embodiment of a high temperature dryer seal according to FIGS. 5A and 5B disposed within an embodiment of a clothes dryer according to the present subject matter.

Referring to FIGS. 5A-5C, an embodiment of a dryer seal, generally designated 90, is provided that can be folded to form a T-shaped seal. The dryer seal 90 can comprise a first base substrate 92. The first base substrate 92 can comprise a textile material, such as a woven, nonwoven, and/or a knit as well as, in some embodiments, a film. For example, in some embodiments, the first base substrate 92 can be a nonwoven substrate that includes a blend of low-melt polymer fibers and high-melt polymer fibers. For example, the first base substrate 92 can comprise a needlepunched nonwoven fabric that can comprise a blend that can be between about 20% and about 80% low-melt polymer fibers and between about 80% and about 20% high-melt polymer fibers. In particular, in some embodiments, the needlepunched nonwoven can comprise a blend of high density polyethylene (HDPE) fibers having a melting point of about 270° F. and polyester fibers having a melting point above about 400° F. In this manner, when the heat within the dryer drum reach temperatures too far above the normal operating temperatures due to some smoldering, ignition activity, or fire within the drum, the low-melt polymers can melt away allowing air to flow therethrough while still providing a structure that can have an integrity to reside between the dryer drum and the bulkhead and not create excessive drum float. With the ability created by the melted polymer within the dryer seal 90 to allow airflow therethrough, any air and smoke mixture within the drum that has become pressurized is allowed to escape from the drum. Thus, the mixture is less likely to reach the critical point where ignition of a smoke explosion is possible and/or likely.

A second base substrate 94 can be secured over a top portion of the first base substrate 92 to form a T-shaped seal with three legs 96. The second base substrate 94 and its securement to the first base substrate 92 can help hold the cross-sectional shape of the seal in the T-shape. As above, the second base substrate 94 can comprise a textile material, such as a woven, nonwoven, and/or a knit as well as an extruded structure. In some embodiments, the second base substrate 94 can comprise a woven scrim. For example, in some embodiments, the second base substrate 94 can comprise a fiber-glass scrim. In some embodiments, the second base substrate 94 can comprise a nonwoven, such as a needlepunched nonwoven or a point-bonded nonwoven. In some embodiments, the second base substrate 94 can comprise a combination of fiber-glass (also referred to as "glass reinforced plastic") substrates comprising of a fine mesh spun bond fiber—glass to act as a substrate for the mineral intumescent coating and a heavier fiber-glass scrim to provide structural integrity and improve a seal nip without causing axial deflection of the drum. In particular, the flexible fine mesh spun bond non-woven can be coated with the mineral intumescent material and can be secured to the more rigid fiber-glass scrim to form the second base substrate 94.

The first base substrate 92 and the second base substrate 94 can be secured together in different manners including, but not limited to stitchbonding, heat bonding, adhesive bonding, RF welding, ultrasonic welding, or the like. The joined first base substrate 92 and the second base substrate 94 forming a T-shape cross-section can form an elongate substrate strip that can be joined together at their ends to form a circular configuration.

In particular as shown in FIG. 5B, when configured for installation within a dryer, the dryer seal 90 can have the first substrate 92 folded in the middle along fold 98 to form leg 96C and be folded again outward more proximal to both sides to form two outward pointing legs 96A. 96B on which the second base substrate 94 positioned outward in an exposed position. Fold 98 also forms a leg 96C that extends generally transverse to legs 96A. 96B and comprises the portion of the dryer seal 90 that fits between a dryer drum rim DR and a bulkhead BH and forms at least a portion of the contact surface of the dryer seal 90. As shown in FIG. 5B, a heat resistant coating 95 can be applied over one or more surfaces of the second base substrate 94.

The heat resistant coating 95 can include inorganic particles and/or additives within a binder material that can provide fire retardant and/or fire resistant properties. As above, the inorganic particles can comprise a mineral base material that can include, but are not limited to, vermiculite, mica, clay materials, calcium carbonate and the like or a mixture thereof. Any additives in the binder material can include but are not limited to intumescent substances. Once coated, the coated substrate of the dryer seal can provide protection outside of a dryer drum in which the seal resides from extreme heat and flame that create temperatures that are greater than the melting point of the low-melt polymer and/or the melting point of the high-melt polymer in first base substrate 92. The coating can also help the dryer seal remain structurally sound during an extreme fire event. The dryer seal 90 can be secured to the rim DR of a drum of a dryer so that at least a portion of the dryer seal 90, such as leg 96C, resides between the bulkhead BH and the rim DR of the drum as shown in FIG. 5C. The first substrate without the coating can contact the bulkhead BH as the drum and seal 90 rotate in the dryer. In some embodiments, the dryer seal 90 can be used as a rear seal as shown in FIG. 5C.

The coated fabrics can then be included in a seal to fit the specific drum and bulkhead interface criteria. The seal and/or the fabrics that are coated can comprise low-melt polymer fibers, a blend of low-melt polymer fibers and other fibers, a blend of low-melt polymer fibers and high-melt polymer fibers that will facilitate the elimination of possibility of smoke explosions within the dryer. The seal formation can be accomplished in many ways including sewing, heat bonding, ultrasonic welding, RF welding, etc.

As stated above and explained in more detail below, the coating can include an intumescent substance and/or a mineral based material. The mineral based material can include but is not limited to vermiculite, mica, clay materials, calcium carbonate and the like or a mixture thereof. Vermiculite is generally known as a hydrated laminar magnesium-aluminum-iron silicate. Due to its crystalline structure, vermiculite expands with the application of heat. The expansion known as exfoliation is the result of the mechanical separation of layers of the vermiculite by the rapid conversion of the contained water into steam. The exfoliated material can then be combined with some form of chemical binder material which can in some instances include, but is not limited to a latex or silicon material. The binder can also comprise intumescent technology whereby the coating will swell and form a multi layered char form when exposed to heat. High carbon char is extremely heat resistant and is widely used in rocket and jet pipe technology. In some embodiments, the binders that comprise one or more intumescent substances can be used with or without a mineral based material. The mineral based material and/or the intumescent substances can, in some embodiments, include nanoparticles and/or microparticles.

Figure 6:
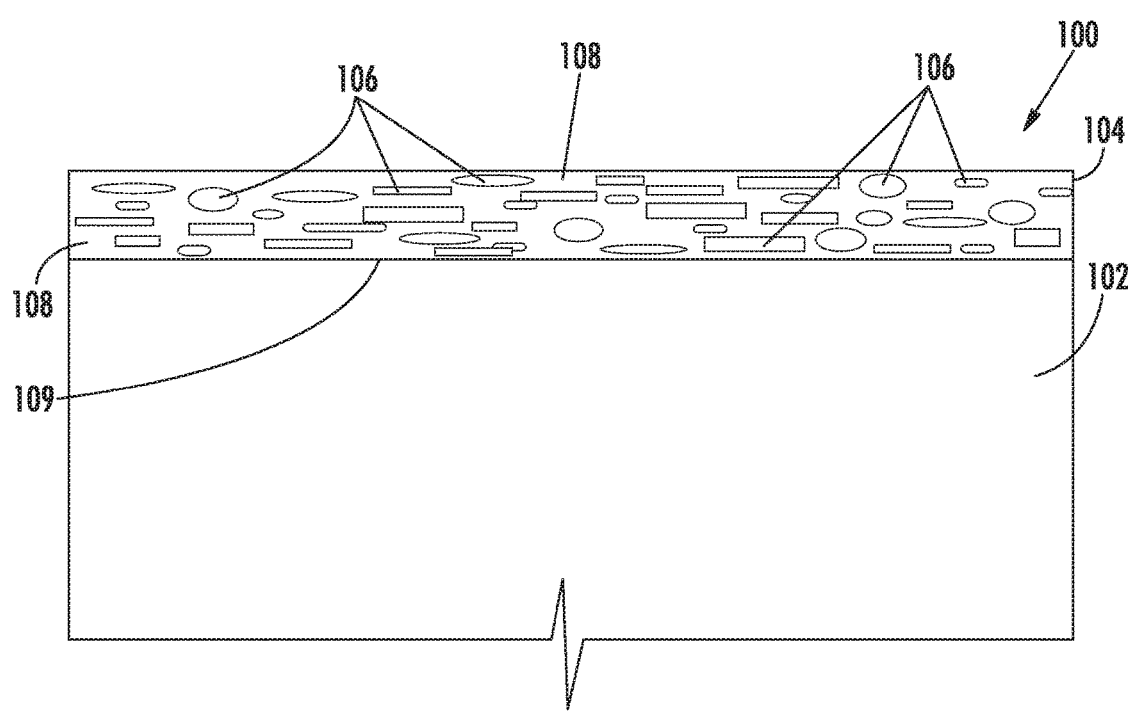
FIG. 6 illustrates a schematic cross-sectional view of a portion of an embodiment of a dryer seal including a heat resistant or fire retardant coating according to the present subject matter.

As shown in FIG. 6, a portion of a fire retardant dryer seal, generally designated 100, that schematically illustrates a heat resistant coating 104 thereon. Dryer seal 100 can comprise a base substrate 102 that can comprise one or more layers of textile material that can include: but is not limited to nonwoven material, woven material, knitted material, film material or combinations thereof. For example, the base substrate 102 can comprise a nonwoven fabric that can be stitchbonded, heat bonded for example through point bonding. Alternatively, the base substrate can be bonded through ultrasonic welding, RF welding, or like. The base substrate 102 can comprise a blend of low-melt polymer fibers and at least one of high-melt fibers or high-temperature burn fibers. In this manner, the base substrate 102 can help to reduce or eliminate the opportunity for smoke explosions from occurring in the dryers that employ these seals, because the low-melt polymer fibers melt when exposed to temperatures above a melting point to create passages for air flow through the dryer seal to allow at least a portion of any air and smoke mixture within a drum of a dryer to which the seal is installed to escape from the drum. In some embodiments, base substrate 102 can be a second substrate that is secured to a different first base substrate that can comprise a blend of low-melt polymer fibers and at least one of high-melt fibers or high-temperature burn fibers.

The dryer seal 100 can have the heat resistant coating 104 disposed on the substrate 102. In the embodiment shown, the heat resistant coating 104 can generally include particles 106 dispersed within a film-forming binder 108. In some embodiments (not shown), a heat resistant coating 104 can comprise an intumescent substance without the inclusion of particles 106.

In some embodiments, the particles 106 can comprise an inorganic mineral. The inorganic mineral particles 106 can generally serve, collectively, to deflect and/or absorb heat energy applied to the coating so that the underlying fabric layer(s) of the base substrate 102 and/or the surrounding environment outside the drum on which the dryer seal 100 is secured are substantially protected. If a more significant fire event occurs in the drum, then the heat resistant coating 104 is activated to insulate and restrict air flow to the fire within the drum from between the dryer rim and the bulkheads. In this manner, the heat resistant coating is activated such that it operates as an expansion material that expands around or in proximity to the drum rim and bulkhead interface to reduce or restrict airflow into the drum to reduce the feeding of any fire therein to help contain such a fire. The inorganic material can be a higher heat capacity that can absorb the heat from an intense fire in and around the drum and insulate and deflect the heat so that the temperature on the other side of the coating 104 from the side exposed to the fire or extreme heat is much lower. For example, if the coating 104 is exposed directly to the heat and flames of a fire within a drum of a dryer, the temperature on the side of the base substrate 102 that is opposite of the side on which the coating resides is much lower. As stated above, the inorganic mineral material forming the particles 106 can include, but is not limited to, vermiculite, mica, clay materials, calcium carbonate and the like, or a mixture thereof.

In one particular embodiment, vermiculite can be included (either alone or in combination with another inorganic mineral material) in the heat resistant coating 104. As stated above, vermiculite can expand with the application of heat with the expansion, resulting from the mechanical separation of the layers within the vermiculite by the rapid conversion of contained water to steam. Without wishing to be bound by any particular theory, it is believed that this expansion mechanism serves to absorb a large portion of the heat applied to the coating, resulting in the underlying fabric or the environment on the opposite side of the expanded coating from the fire or extreme heat being sufficiently protected from that heat. Thus, the expanded material is particularly suitable for enduring the quick exposure to heat, for example, from a flash fire within a dryer, to protect the environment on the opposite side of the expanded coating from the fire and its heat.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 106 may, generally, have a plate-like shape in that each particle's thickness is less than the width and/or length. This particular shape of the particles 106 can be formed via granulation and/or exfoliation as discussed above. For instance, each particle 106 can have a thickness that is at least about 10 times less than the largest dimension of the particle. For example, the particles 106 can have an aspect ratio (width/length:thickness) of between about 500:1 to about 1000:1.

For example, the particles 106 may have an average thickness of less than about 50 nm, such as about 0.1 nm to about 50 nm when exfoliated. Alternatively, the particles 106 may have a larger dimension of about 0.5 µm to about 50 µm. For instance, the particles 106 may have a diameter or a greater dimension (in length or width) in the range of from about 10 µm to about 40 µm. As such, in certain embodiments, the particles 106 may have an average thickness of about 0.5 nm to about 10 nm, and may have a larger dimension of about 10 µm to about 40 µm (e.g., width and/or length). In one particular embodiment, the particles 106 can have an average size of about 1 nm to about 2 nm in its thickness while having an average diameter or larger dimension in width or length of about 20 µm to about 40 µm.

Such a relatively small particle size can allow for a relatively large surface area of the mineral material for absorbing and/or dispersing heat applied thereto. Additionally, the use of such relatively small particles allows the coating to remain flexible.

The film-forming binder 108 generally serves to adhere and hold the particles 106 in place within the heat resistant coating 104 on the base substrate 102. Thermal set or thermoplastic binders can be utilized to facilitate the coating process. Such binder materials include, but are not limited to, acrylic resins, styrene-butadiene rubber (SBR), polyvinyl alcohol, ethyl vinyl acetate resins, phenolic resins: etc., and combinations thereof. Additionally, other types of substances can be included in the binder 108.

A binder 108 can adhere to a portion of the dryer seal 100 to provide heat resistance, fire retardancy, and/or fire resistance to the dryer seal 100 while the dryer seal 100 still provides friction reduction and/or sealing capabilities. Regarding its fire resistance capabilities, the binder 108 can be formulated to include certain desired properties. Such properties, for example, can include, but are not limited to, having a low flame spread; having low smoke toxicity; providing thermal insulation protection; providing long term protection from heat and flame: having a low smoke production; easy application; good wear resistance; adherence to the desired base substrate; and the appropriate flexibility after application to permit the dryer seal to perform its intended functions.

In some embodiments, binder 108 can comprise an intumescent coating which can fulfill many of these properties. An intumescent is a substance that swells as a result of heat exposure, thus increasing in volume and decreasing in density. The term intumescent when applied to fire protective coatings refers to a technology wherein the coating will swell and form a multi-layered char foam when exposed to heat. High carbon containing chars are extremely heat resistant and can be employed in critical high temperature applications such as the carbon on carbon composites that are machined to produce rocket exhaust nozzles. The production of these carbon on carbon composites involves the combination of graphite fibers with high char yield epoxies. After curing, these parts are graphitized in a high-pressure autoclave at high temperatures. Intumescent materials can be thermally stable to above 1,000° C. (1,832° F.). With the right choice of materials, intumescent coatings can produce a low thermally conductive char foam. Thus, a coating 104 that includes an intumescent substance can form a char foam that has a low thermal conductivity when exposure to fire and/or extreme heat.

Soft char intumescent substances can produce a light char that is a poor conductor of heat, thus retarding heat transfer. Typically, these intumescent substances can also contain a significant amount of hydrates. As the hydrates are spent, water vapor is released, which has a cooling effect. Once the water is spent, the insulation characteristics of the char that remains can slow down heat transfer from the exposed side to the unexposed side of a dryer seal 100 that includes a coating 104. Typically, the expansion pressure that is created for these products is very low, because the soft carbonaceous char has little substance, which is beneficial if the aim is to produce a layer of insulation. Harder char intumescent substances can be produced with sodium silicates and graphite. These intumescent substances can produce a more substantial char capable of exerting quantifiable expansion pressure. For example, in some embodiments, such intumescent substances can be used as at least a portion of the binder 108 and the inorganic particles can comprise a vermiculite material as discussed above in the dryer seal 100.

While not being bound by any particular theory, it is contemplated that if a fire was to ignite in a drum, the heat resistant coating 104 of the dryer seal 100 could expand to effectively restrict the air flow into drum of the clothes dryer between the drum rim and the bulkheads. For example, in some embodiments, the air flow can be restricted to between about 15 cubic feet per minute (cfm) to about 30 cfm. This expansion can have the effect of starving any fire or potential flame so that the combustible material within the drum only smolders and does not ignite into flame and/or stay ignited. Further, the fire can be prevented from propagating through the dryer seal. This effect combined with the insulative qualities of both such a binder 108 and inorganic particles 106 in heat resistant coating 104 can increase the effectiveness of the ability of the dryer seal to facilitate containment of dryer fires within the cabinet body.

For example, the intumescent substances that can be included within the binder 108 when activated by heat to expand, i.e., char, can have a restricted air permeability of between about 15 and about 30 cfm which permits fire inside the drum to be contained, smoldering and slowly consuming the combustible material but not permitting sufficient oxygen to enter the drum and create a more violent and high temperature fire. Tests have been conducted within a drum of clothes dryers and/or apparatuses that simulate the interior chamber of a drum of a clothes dryer that indicate that a combustion event will not exceed a maximum temperature of 800° F. when an intumescent material within a binder 108 on a dryer seal is activated. Without the intumescent, the temperatures within the drum of clothes dryers and/or apparatuses that simulate the interior chamber of a drum of a clothes dryer can reach and exceed 1,250° F.

In particular for some embodiments of the heat resistant coatings 104 in which the binders 108 comprise an embodiment of one or more intumescent substances, the chemistry of char formation can provide a classic dehydration reaction between hydroxyls, carboxylic acids and amines or amine groups to form polymeric linkages. The dehydration reaction requires heat and can be enhanced by an acid catalyst. Water and ammonia can be liberated during these reactions. Some such substances can contain oxygen or nitrogen on every carbon and have a natural propensity for char formation. Examples can include starches and sugars. Intumescent substances can comprise amino phosphates or amino sulfonates that, upon heating, can liberate phosphoric or sulfonic acid to catalyze the dehydration reaction and ammonium ions to facilitate char formation. In some embodiments, polymeric substances without an aliphatic carbon chain can be used as at least a portion of such binders 108. Intumescent materials that have more nitrogen and oxygen on the hydrocarbon chains can be more desirable.

Commercial examples of an intumescent substance that are available include INTUMAX manufactured by Broadview Technologies, Inc. located in Newark, N.J. Such intumescent agents can allow the use of less intumescent agent in a binder's formulation, which, in turn, can improve the physical and adhesive properties of the coatings. Many others sources of intumescent substances that can be added to binder materials are available.

To formulate intumescent coatings several additional chemistry considerations can be considered. For example, higher amounts of oxygen and nitrogen on carbon can make it easier to produce a char. In addition, the more double bonds the less heat will be released during the initial burning stage. Also, the temperatures at which dehydration and de-hydrogenation reactions occur vary for different polymers. The choice of an intumescent substance can affect the release of acid catalyst, oxygen addition catalyst and recombinant ammonium ions. In some embodiments, the intumescent substance used can release acid catalyst, oxygen addition catalyst and recombinant ammonium ions close in time to or simultaneously with the dehydrogenation and dehydration reactions.

Other considerations involve the melt flow rheology, the char height and char strength. There are also the conventional formulation considerations having to do with everything from thixotropic behavior to flexibility and everything in between. The formulation of the binder 108 that include one or more intumescent substances can be such that the formulation can help char properties not hurt them. For example, since char layers remain on the surface, wetting agents and defoamers that reduce surface tension may want to be avoided. Certain fillers can have synergistic benefits. The particles 106 can comprise ceramic and phenolic micro spheres that can add to the thermal insulative properties. Intumescent substances can be added to binder materials such as, but not limited to, acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 104. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating. Exemplary surfactants can include nonionic surfactants and/or ionic surfactants.

A plasticizer may also be included in the heat resistant coating 104. A plasticizer is an additive that generally increases the flexibility of the final coating by lowering the glass transition temperature for the binder (and thus making it softer). In one embodiment, the plasticizer can be present in the heat resistant coating 104 up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight polyethylene oxide. The viscosity modifier can be included in any amount to help the coating process, such as up to about 5% by weight, such as about 0.5% to about 3% by weight.

To form the fire retardant portion of the dryer seal 100, the particles 106 of inorganic material can be combined with the film-forming binder 108 to form a coating/paste, which can then be wet-laid onto a surface 109 of the base substrate 102 and dried to form the coating 104. For example, the particles 106 can be combined as dry particles or dispersed within a solvent system, as discussed above. After drying, the inorganic material of the particles 106 can constitute about 0.5% by weight to about 99.5% by weight of the total weight of the heat resistant coating 104 (e.g., about 50% by weight to about 95% by weight).

Depending on the level of heat shielding desired for a particular application, the thickness of the heat resistant coating 104 can be varied along with the type of inorganic material included in the particle 106 and/or the concentration of particles 106 in the coating 104. In most embodiments, the thickness of the heat resistant coating 104 can be about 10 μm to about 1 mm (e.g., about 10 μm to about 100 μm).

In some embodiments, a single application of the heat resistant coating 104 on the base substrate 102 may be sufficient. However, multiple applications are available and can be applied using the method as described above. Thus, the presently described dryer seal 100 is not limited to a single layer of the heat resistant coating 104 on a substrate 102 of the dryer seal 100.

Figure 7:
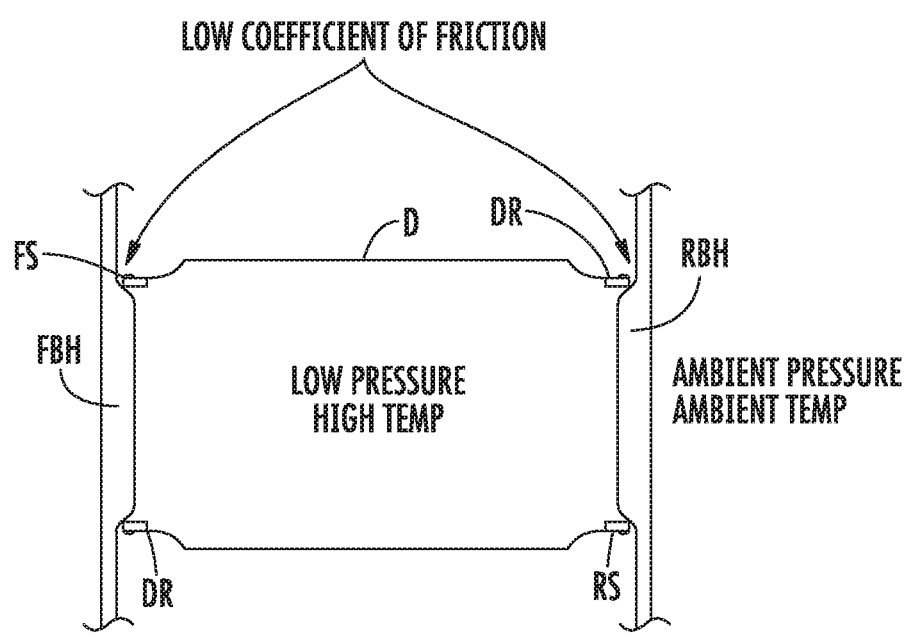
FIG. 7 illustrates a schematic cross-sectional view of a drum portion of a clothes dryer using one or more embodiments of high temperature dryer seals according to the present subject matter showing the temperature differential across the seals.

FIG. 7 shows a schematic of a dryer having a front bulkhead FBH and a rear bulkhead RBH with a drum D placed therebetween. A front dryer seal FS is provided that is treated with a heat resistant coating as described above. The front dryer seal FS can be located between the front bulkhead FBH and a front drum rim DR of the drum D. Additionally, a rear dryer seal RS that includes a first base substrate comprising a blend of low-melt polymer fibers and at least one of high-melt fibers or high-temperature burn fibers and that is treated with a heat resistant coating as described above can be located between the rear bulkhead RBH and a rear drum rim DR of the drum D. For example, the dryer seals FS and RS can be attached to the drum rims DR of the drum D. As shown in FIG. 7, the rear dryer seal RS can help to reduce or eliminate the opportunity for the occurrence of smoke explosions in the dryers that employ these seals by the low-melt polymer fibers in the rear dryer seals RS melting when exposed to temperatures above a melting point. The melting of the low-melt polymer fibers creates passages for air flow through the rear dryer seal RS to allow at least a portion of any air and smoke mixture within the drum D of the respective dryer to which the seal is installed to escape from the drum D. In certain circumstances in some embodiments, the seal can comprise 100% low-melt polymers. The melting of the entire low-melt rear seal diameter will permit the exit of air and smoke mixture across the entire appliance drum diameter. For example, the low-melt polymer fibers, once melted when exposed to temperatures above the fiber's melting point, can create passages for air flow between the rim DR of the drum D and the rear bulkhead RBH of a dryer of between about 0.010 inches and about 0.020 inches around the rim of the drum. In some embodiments, the front dryer seal FS can also include a first base substrate comprising a blend of low-melt polymer fibers and at least one of high-melt fibers or high-temperature burn fibers.

If a fire continues to grow within the drum D and the temperature within the drum continues to rise, the front dryer seal FS and the rear dry seal RS can have their heat resistant coating activated to try and restrict air flow into the drum D and smother or contain the fire therein. In particular, due to the properties of the inorganic particles and, possibly, the properties of certain additives to the binder material of the heat resistant coating, air supply can be restricted by the swelling of the coated surfaces of the dryer seals FS and RS to help contain, or in some instances smother, any fire within the drum D.

The amount of heat resistant coating can be applied in a manner that can be similar to or match the tolerances of the drum within the dryer. For example, a typical dryer drum in its optimum design condition has a drum/bulkhead component tolerance of approximately 0.800 inches. As stated above, in some embodiments, heat resistant coatings on the surfaces of the second substrate that equal about 0.011 inches thick that includes an intumescent substance can grow to approximately 0.300 inches when heat activated. Thus, for a tolerance of approximately 0.600 inches, a double layer of second substrates with each second substrate having heat resistant coatings that equal about 0.011 inches can produce a full intumescent restriction within the drum and bulkhead gap. In some embodiments, a third intumescent substrate can be incorporated to permit a further 0.300 inch seal opening due to the collapse of the drum in the event that the front dryer seal is completely destroyed.

Through heat and flame resistant coatings that comprises mineral based material and/or intumescent substances that is applied on flexible substrates, seals can be provided for use within domestic appliances, such as dryers, that can provide better protection against fire and against exposure to higher temperatures. Current technology uses treated polymers to achieve flame retardant requirements, but fails at, heat above about 400° F. Natural or blends of natural fibers can extend the temperature to about 700° F. and are commonly used in such seal applications. Treated synthetic fibrous cellulosic materials are also used in the current technology, but these materials also do not provide the necessary protection at the potential temperature experienced in a dryer fire. The introduction of a vermiculite based and/or intumescent technology seal can extend the range of heat resisting properties whilst enhancing both the static and dynamic fire containment properties in front and/or rear seals used in clothes dryers to help satisfy industry and governmental standards. Currently, there is no dryer seal that at least partially melts to allow air and smoke to escape from the clothes dryer to prevent a smoke explosion and that has a heat resistant coating that then activates to expand to restrict air flow in the drum at higher temperatures to reduce the likelihood of ignition of a fire or reduce the flames of any fire that has ignited to contain the fire within the drum until any flammable material therein is expended.

FIG. 8 illustrates a high temperature dryer seal, generally designated 110, can comprise a first base substrate 112. The first base substrate 112 can comprise a blend of low-melt polymer fibers and at least one of high-melt fibers or high-temperature burn fibers. The first base substrate 112 can form contact surfaces (not shown) of the dryer seal 110 for contacting portions of a dryer when the seal 110 is installed in the dryer. First and second ends (not shown) of the first base substrate 112 can be secured together so that the first base substrate 112 forms at least a portion of an annular shape. Further, a second substrate 114 can be provided on which a heat resistant coating 116 can be disposed. The second substrate 114 can be secured to the first base substrate 112 on at least a portion of a surface of the first base substrate 112 that does not comprise the contact surfaces. In the embodiment shown, the second substrate 114 is stitchbonded by stitching lines 118 to the first base substrate 112. The heat resistant coating 116 can comprise particles of an inorganic mineral material dispersed within a binder.

In the embodiment shown in FIG. 8, the first base substrate 112 can help to reduce or eliminate the opportunity for smoke explosions to occur in the dryers that employ these seals, once the low-melt polymer fibers melts when exposed to temperatures above a melting point. The passages created by the melted fibers allow air to flow through the dryer seal 110 to allow at least a portion of any air and smoke mixture within a drum of a dryer to which the seal is installed to escape from the drum reducing the opportunity for the mixture to reach a critical point. Additionally, the heat resistant coating 116 can be activated if a fire continues to grow within the drum and the temperature within the drum continues to rise. The heat resistant coating 116, once activated, can restrict air flow into the drum and smother or contain the fire therein. In particular, due to the properties of the inorganic particles and/or, possibly, the properties of certain additives to the binder material of the heat resistant coating, air supply can be restricted by the swelling of the coated surfaces of the second substrate 114 to help smother the fire. In some embodiments, the first base substrate can comprise 100% low-melt polymer fibers.

Figure 9A:
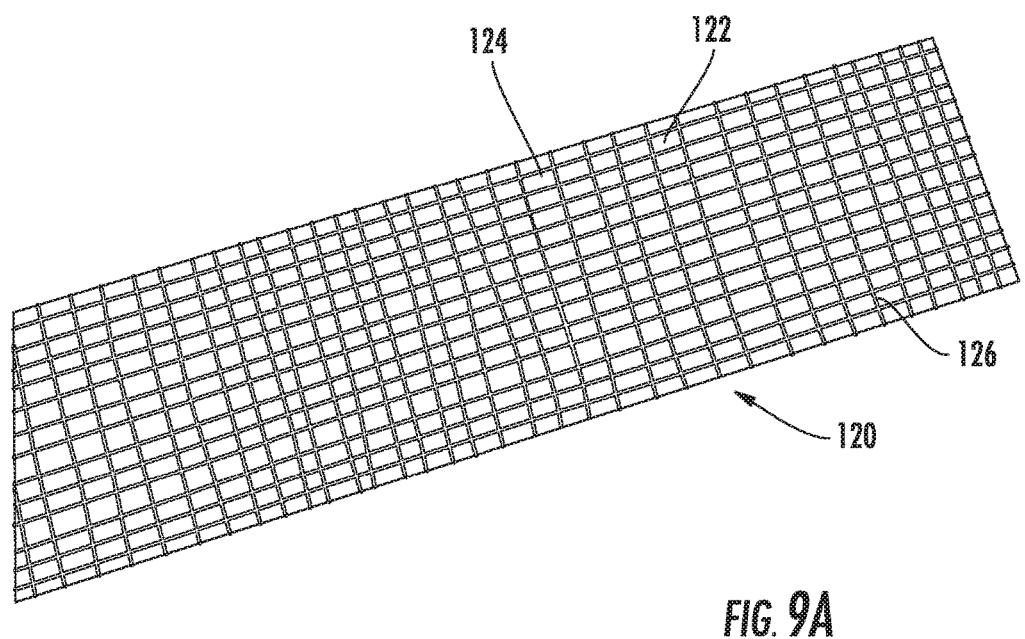
FIGS. 9A and 9B illustrate perspective views of a portion of an embodiment of a second substrate that can be used in a further example embodiment of a high temperature dryer seal according to the present subject matter.
Figure 9B:
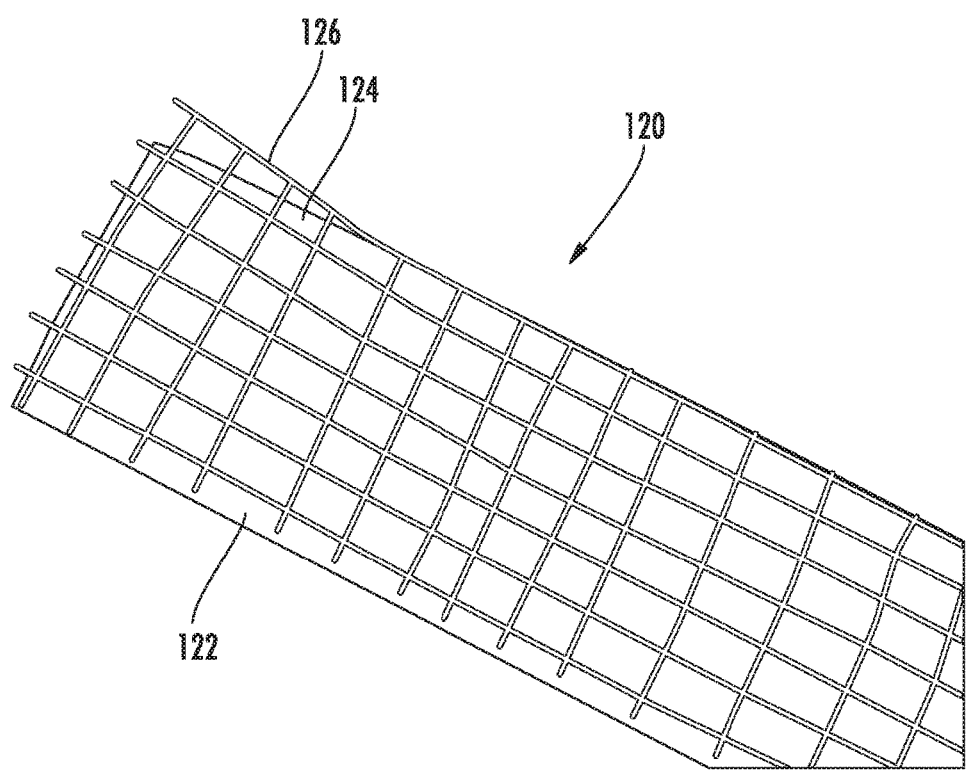

Referring to FIGS. 9A and 9B, a second substrate, generally designated 120, is provided that acts as a substrate for a heat resistant coating 122 but at the same time provides structural integrity to improve the seal nip without causing axial deflection of the drum. The second substrate 120 comprises a combination of two glass reinforced plastic nonwovens. The second substrate 120 can comprise a fine mesh spun bond fiberglass 124 to act as a substrate for the mineral intumescent coating. The coating 122 can be applied to one or both sides of the fine mesh spun bond fiberglass 124. The second substrate 120 can also comprise a heavier fiberglass scrim 126 (best seen in FIG. 9B) to which the fine mesh spun bond fiberglass 124 can be attached and/or secured. The heavier fiberglass scrim 126 can provide the structural integrity and improve the seal nip without causing axial deflection of the drum. In some embodiments, the heat resistant coating 122 can be applied to the fine mesh spun bond fiberglass 124 after the fine mesh spun bond fiberglass 124 is secured to the heavier fiberglass scrim 126. In some embodiments, the heat resistant coating 122 can be applied to the fine mesh spun bond fiberglass 124 before the fine mesh spun bond fiberglass 124 is secured to the heavier fiberglass scrim 126.

Figure 10A:
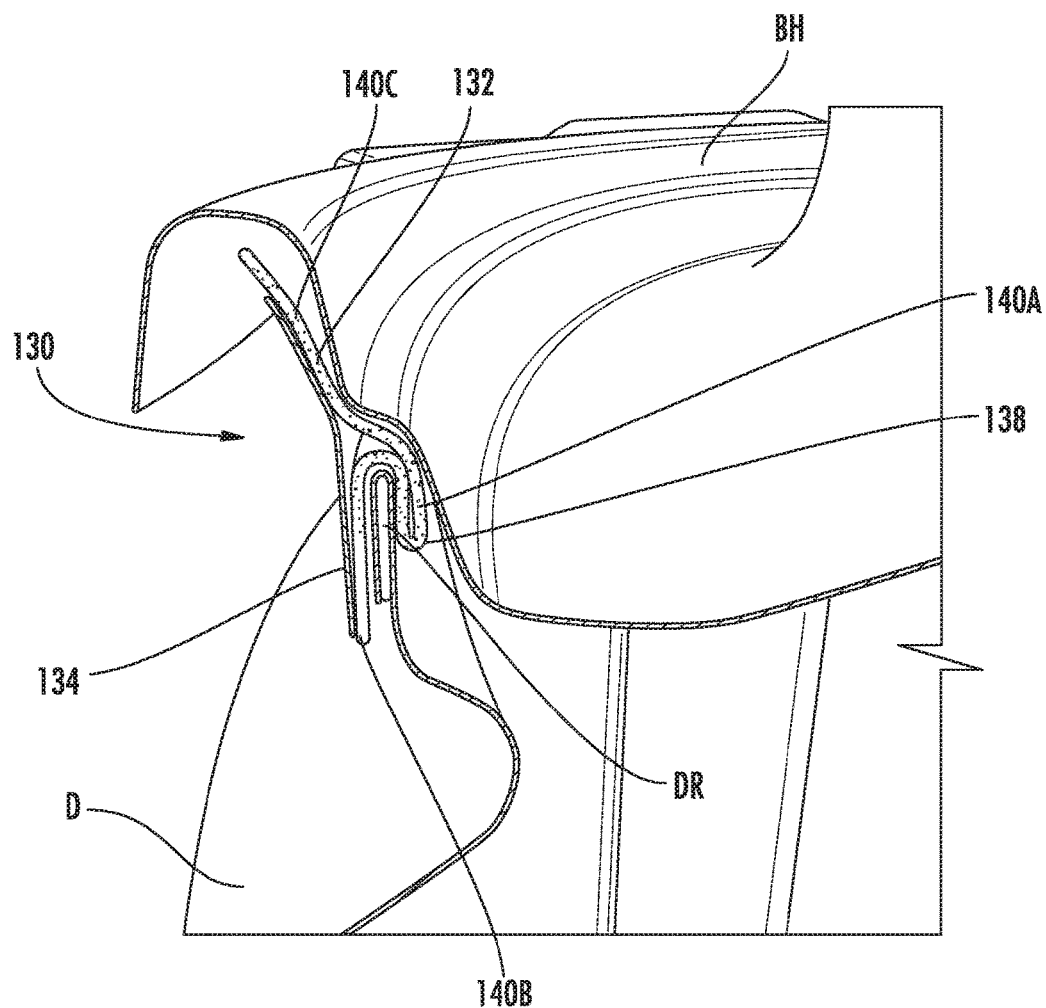
FIGS. 10A-10C illustrate perspective partial cross-sectional views of a portion of an embodiment of a dryer using an embodiment of a high temperature rear dryer seal according to the present subject matter.
Figure 10B:
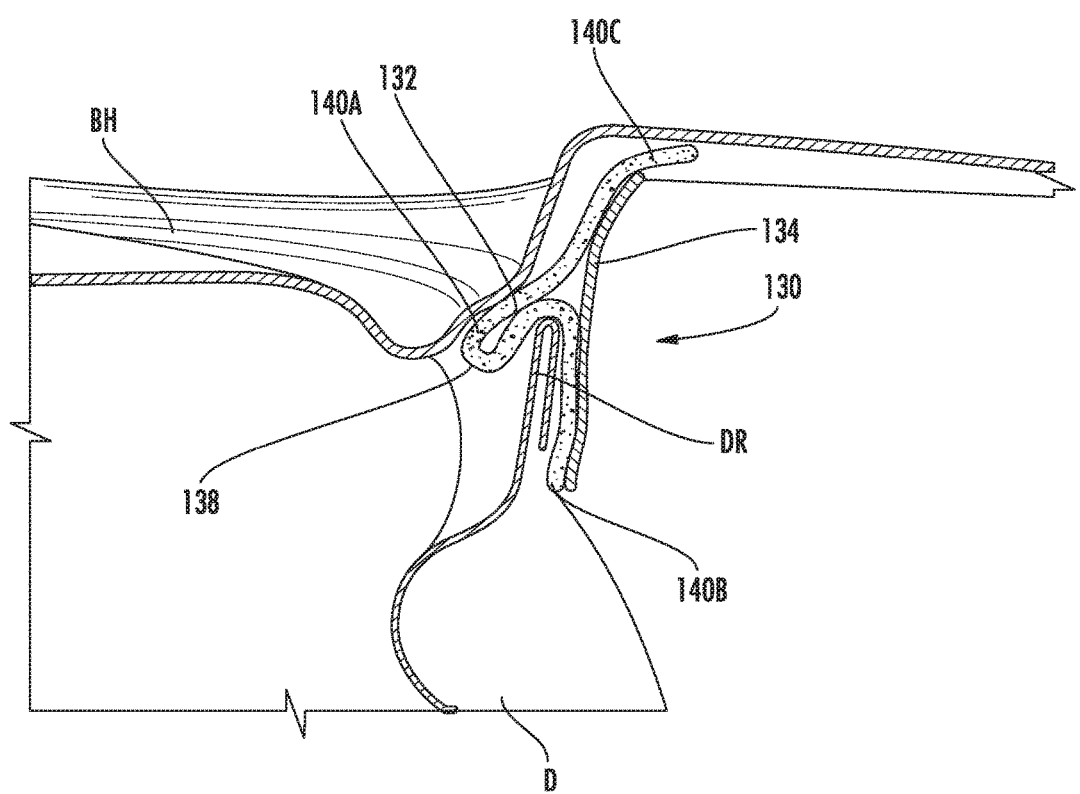
Figure 10C:
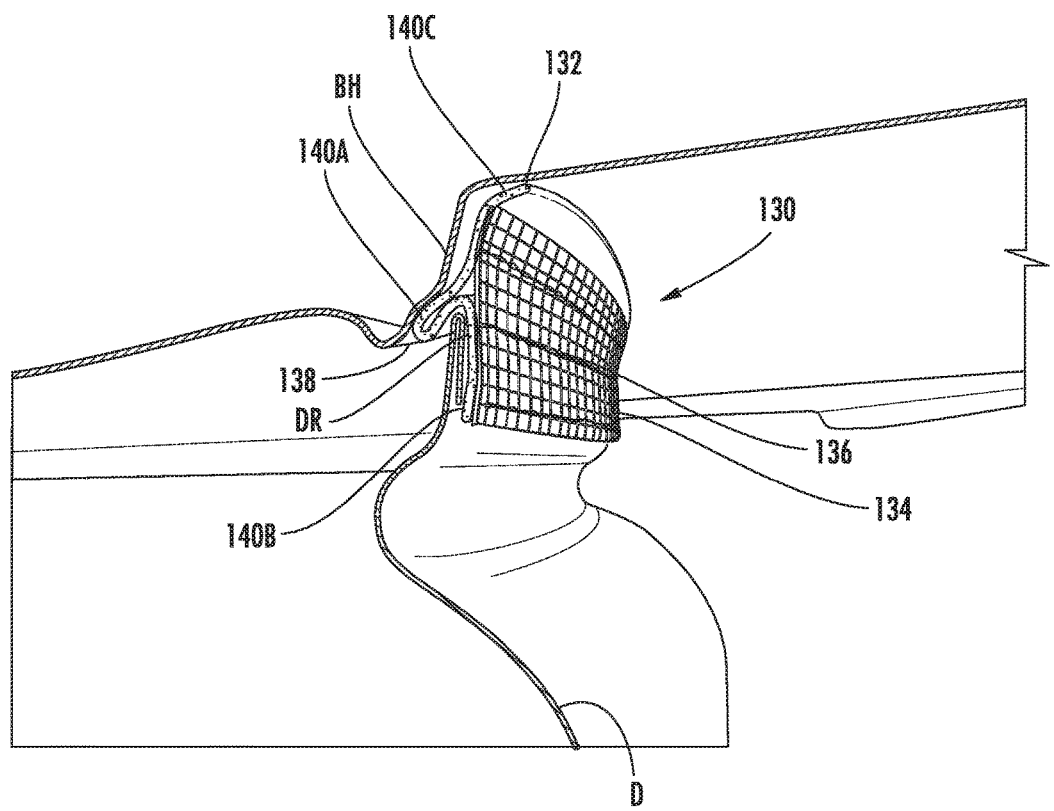

Referring to FIGS. 10A-10C, an embodiment of a dryer seal, generally designated 130, is provided that can be folded to form a T-shaped seal. The dryer seal 130 can comprise a first base substrate 132 and a second substrate 134 secured together, for example, by stitching lines 136 of a stichbond. The joined first base substrate 132 and the second base substrate 134 forming a T-shape cross-section can form an elongate substrate strip that can be joined together at their ends to form a circular configuration. In some embodiments, the first base substrate 132 can comprise low-melt polymer fibers. In some embodiments, the first base substrate 132 can comprise a blend of low-melt polymer fibers and at least one of high-melt fibers or high-temperature burn fibers as described in detail above. In some embodiments, the first base substrate 132 can comprise 100% low-melt polymer fibers. As installed in a drum D of a dryer, the dryer seal 130 can have the first substrate 132 folded in the middle along fold 138 to form a leg 140A and be folded again outward more proximal to both sides to form two outward pointing legs 140B, 140C on which the second base substrate 134 is secured in an outward exposed position. The folds, including fold 138, form leg 140C so that it extends generally transverse legs 140A, 140B and comprises the portion of the dryer seal 130 that fits between a dryer drum rim DR of the drum D and a bulkhead BH of the dryer to form at least a portion of the contact surface of the dryer seal 130. As shown in FIG. 10C, a heat resistant coating 142, as described in detail above, has been applied over one or more surfaces of the second base substrate 134.

Thus, the high temperature dryer seals disclosed herein can comprise a first base substrate having a first end and a second end. The first base substrate comprising a low-melt polymer with the first base substrate forming contact surfaces of the dryer seal for contacting portions of a dryer when installed in the dryer. The first end and the second end of the first base substrate secured together so that the first base substrate forms at least a portion of an annular shape. The fire retardant dryer seal can also include a heat resistant coating disposed on the dryer seal that does not comprise the contact surfaces of the first base substrate. In some embodiments, the heat resistant coating can be disposed on at least a portion of a surface of the first base substrate that does not comprise the contact surfaces. In some embodiments, the heat resistant coating can be disposed on a second substrate secured to the first base substrate. In some embodiments, the heat resist coating can be activated at a temperature that is higher than a melting point of the low-melt polymer. In some embodiments, the heat resistant coating can be activated at temperatures above the melting point of the low-melt polymer to cause the heat resistant coating to expand to restrict air flow into the drum. In some embodiments, the heat resistant coating can comprise particles of at least one of an inorganic mineral material or an intumescent substance dispersed within a binder.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A high temperature dryer seal comprising:
   a first base substrate having a first end and a second end, the first base substrate comprising a low-melt polymer and forming contact surfaces of the dryer seal for contacting portions of a dryer when installed in the dryer;
   the first end and the second end of the first base substrate secured together so that the first base substrate forms at least a portion of an annular shape; and
   a heat resistant coating disposed on at least a portion of a surface of the first base substrate that does not comprise the contact surfaces, the heat resistant coating being activated at a temperature that is higher than a melting point of the low-melt polymer to allow the formation of one or more passages for air flow through the dryer seal upon the melting of the low melt polymer and before the heat resistant coating is activated.

2. The dryer seal according to claim 1, wherein the first base substrate comprises a nonwoven fabric, woven fabric or a knitted fabric.

3. The dryer seal according to claim 1, wherein the low-melt polymer comprises low-melt polymer fibers and the first substrate comprises a needle-punched nonwoven fabric comprising a blend of the low-melt polymer fibers and at least one of high-melt fibers or high-temperature burn fibers.

4. The dryer seal according to claim 1, wherein the low-melt polymer comprises low-melt polymer fibers.

5. The dryer seal according to claim 1, wherein the low-melt polymer comprises low-melt high density polyethylene (HDPE) fibers and the first substrate comprises a needle-punched nonwoven fabric comprising a blend of the low-melt high density polyethylene (HDPE) fibers and polyester fibers.

6. The dryer seal according to claim 5, wherein the first substrate comprises a needle-punched nonwoven fabric comprising a blend of high density polyethylene (HDPE) fibers having a melting point of about 265° F. and polyester fibers having a melting point above about 450° F.

7. The dryer seal according to claim 1, wherein the low-melt polymer comprises low-melt high density polyethylene (HDPE) fibers and the first substrate comprises a needle-punched nonwoven fabric comprising the low-melt high density polyethylene (HDPE) fibers.

8. The dryer seal according to claim 1, wherein the low-melt polymer comprises low-melt high density polyethylene (HDPE) fibers and the first substrate comprises a needle-punched nonwoven fabric comprising a blend of the low-melt high density polyethylene (HDPE) fibers and high-melt polypropylene fibers.

9. The dryer seal according to claim 1, wherein the passages for air flow formed through the dryer seal when the low melt polymers fibers melt due to exposure to temperatures above the melting point of the low melt polymer allow at least a portion of any air and smoke mixture within a drum of a dryer to which the seal is installed to escape from the drum.

10. The dryer seal according to claim 1, wherein the low-melt polymer fibers once melted when exposed to temperatures above a melting point to create passages for air flow between a rim of a drum and a bulkhead of a dryer of about 0.010 inches and about 0.020 inches around the rim of the drum.

11. The dryer seal according to claim 1, wherein the low-melt polymer melts at between about 265° F. and about 300° F.

12. The dryer seal according to claim 1, wherein the heat resistant coating is activated at temperatures above the melting point of the low-melt polymer to cause the heat resistant coating to expand to restrict air flow into the drum.

13. The dryer seal according to claim 1, wherein the heat resistant coating comprises particles of at least one of an inorganic mineral material or an intumescent substance dispersed within a binder.

14. A high temperature dryer seal comprising:
   a first base substrate having a first end and a second end, the first base substrate comprising at least partially of a low-melt polymer and forming contact surfaces of the dryer seal for contacting portions of a dryer when installed in the dryer;
   the first end and the second end of the first base substrate secured together so that the first base substrate forms at least a portion of an annular shape;
   a second base substrate being secured to the first base substrate on at least a portion of a surface of the first base substrate that does not comprise the contact surfaces; and
   a heat resistant coating disposed on at least a portion of a surface of the second base substrate that does not comprise the contact surfaces, the heat resistant coating being activated at a temperature that is higher than a melting point of the low-melt polymer to allow the formation of one or more passages for air flow through the dryer seal upon the melting of the low melt polymer and before the heat resistant coating is activated.

15. The dryer seal according to claim 14, wherein the second substrate comprises a nonwoven fabric, woven fabric or a knitted fabric.

16. The dryer seal according to claim 14, wherein the second substrate comprises a structure to provide structural integrity and improve the seal nip without causing axial deflection of the drum.

17. The dryer seal according to claim 14, wherein the second substrate comprises a glass reinforced plastic nonwoven.

18. The dryer seal according to claim 14, wherein the second substrate comprises a fine mesh spun bond fiberglass to act as a substrate for the mineral intumescent coating and a heavier fiberglass scrim to provide structural integrity and improve the seal nip without causing axial deflection of the drum.

19. The dryer seal according to claim 14, wherein the heat resistant coating disposed on both a first surface and second surface of the second base substrate.

20. The dryer seal according to claim 14, wherein the heat resistant coating is activated at temperatures above the melting point of the low-melt polymer to cause the heat resistant coating to expand to restrict air flow into the drum.

21. The dryer seal according to claim 14, wherein the heat resistant coating comprises particles of at least one of an inorganic mineral material or an intumescent substance dispersed within a binder.

* * * * *